United States Patent Office 3,361,575
Patented Jan. 2, 1968

3,361,575
PROCESS FOR TREATING LEGUME
SEED PARTICULATES
Twila M. Paulsen, Minneapolis, Minn., assignor to Archer-Daniels-Midland Company, Minneapolis, Minn., a corporation of Delaware
Filed Aug. 12, 1963, Ser. No. 301,559
3 Claims. (Cl. 99—98)

This application is a continuation-in-part of application Ser. No. 75,923 filed Dec. 15, 1960 and now U.S. Patent 3,100,709.

This invention relates to an improvement in the method of processing particulates of legume seed material in the form of grits, flakes, meal, flour and the like to render said material more acceptable and desirable for use in foods and the improved products obtained therefrom and therewith. More specifically, the improvement herein relates to a particular method of treating legume seed particulates under critical conditions of application with not over a maximum water content of 20% over equilibrium moisture and in a temperature range of about 65° C. to 100° C., and preferably at about 80°–90° C., for about 30 seconds to about 15 minutes for a period of uniform treatment without change in the protein dispersible index (PDI) "Determination of Water-Soluble Protein in Soybean Oil Meals and Flours," Jour. AOCS, 37, 165 (1960), Paulsen, Twila M., Holt, K. E. and Anderson, R. E., and without using a typical wet heat treatment, salts or acids.

The essential problem is to provide a high protein content in foods with a soybean material devoid of soybean odor or flavor and detrimental changes in the functional, physical and chemical properties, with uniformity and consistency in results in processing and ultimate food evaluation.

The art has been continuously searching and seeking for ways in which to improve soybean material for use as a protein supplement in staple articles of food. The problem is primarily to remove the objectionable characteristic soybean odor and taste. Then the problem has been to ultimately obtain uniformity and consistency in processing and in the ultimately resulting food products.

Accordingly it is an object of this disclosure to provide the art with the discovery of a process of treating soybean particulates to effect removal of the characteristic soybean odor and taste without detrimental changes in functional, physical and chemical characteristics and comprises treating 100 parts of essentially dry soybean particulates with from about 0.25 part to about 5 parts water-soluble peroxide, such as hydrogen peroxide, sodium peroxide or urea peroxide added to soybean particulates with not over about 20% moisture in excess of equilibrium moisture of said soybean particulates, holding the treated particulates at a temperature of about 65° C. to 100° C. for a period of uniform treatment of from about 30 seconds to about 15 minutes, and drying said particulates by cooling until equilibrium moisture is achieved.

From the following description of this discovery, in conjunction with the accompanying graphs, the objectives and advantages will become more apparent.

By the drawings, there is illustrated in:

FIGURE 1, a graph illustrative of the functional and physical characteristics of a 20% slurry at different pH's as measured in a Brabender Visco-Amylo-Graph for dehulled, defatted particulates treated with the combination of protonic acids and their salts with hydrogen peroxide and ground to flour fineness of 100% through 100 mesh and 97% through 200 mesh, tested under a heating cycle of 25° to 97° C. and then a holding period of 15 minutes at 97° C., followed by cooling to 25° C. The PDI of this treated soybean flour was 10 to 20%.

FIGURE 2, a graph illustrative of the functional and physical characteristics of chemically untreated soybean particulates having a PDI of 90 to 100%, ground to flour fineness and tested in a manner identical to FIGURE 1.

Figure 1:
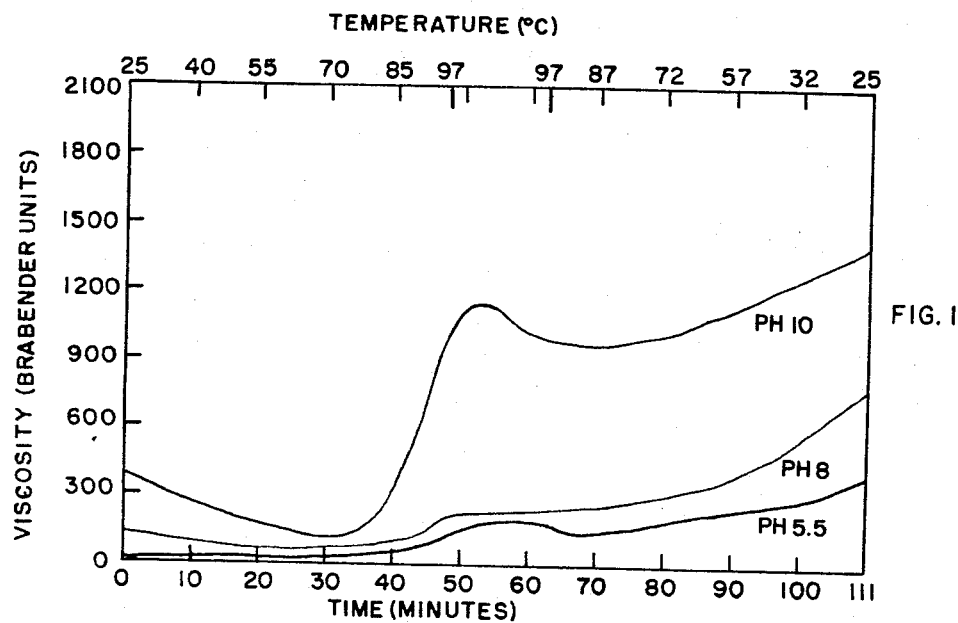

The following examples are non-limiting illustrations of the chemical treatment of legume seed particulates exemplified by soybean particulates material and resulting products herein provided, as follows:

EXAMPLE NO. I

A solution of $H_2O_2$ in water was sprayed onto dehulled, hexane-extracted soybean flakes at 80–100° C. while blending in a manner, i.e. in an insulated, baffled, rotating drum or a high-speed mechanical blendor, so as to obtain uniform distribution of the solution on the flakes. The treating temperature was held at temperature for 5 mins. and the treated soybean flakes were air-dried to equilibrium moisture and ground to pass 100% through a 200-mesh screen.

The proportions for chemical treatment were:

|  | Parts |
| --- | --- |
| Soybean flakes | 100 |
| $H_2O_2$ (50%) | 2 |
| $H_2O$ | 8 |

EXAMPLE NO. II

Same as Example No. I but dehulled, full-fat soybean flakes were used instead of hexane-extracted soybean flakes.

EXAMPLE NO. III

Same as Example No. I down to proportions, except time for heat treatment was 2½ mins. instead of 5 mins.

|  | Parts |
| --- | --- |
| Soybean flakes | 100 |
| $H_2O_2$ (25%) | 4 |
| $H_2O$ | 4 |

EXAMPLE NO. IV

Same as Example No. III but dehulled, full-fat soybean flakes instead of hexane-extracted soybean flakes. All full-fat examples were ground to about 15–35 mesh.

EXAMPLE NO. V

Same as Example No. I down to proportions for chemical treatment:

|  | Parts |
| --- | --- |
| Soybean flakes | 100 |
| $Na_2O_2$ | 5 |
| $H_2O$ | 10 |

EXAMPLE NO. VI

Same as Example No. I down to proportions for chemical treatment:

| | Parts |
|---|---|
| Soybean flakes | 100 |
| $CO(NH_2)_2 \cdot H_2O_2$ | 5 |
| $H_2O$ | 10 |

EXAMPLE NO. VII

Treatment same as for Example I except the soybean flakes had been defatted using glacial acetic acid in hexane, as follows:

Proportions for extraction of oil and chemical treatment:

| | Parts |
|---|---|
| Full-fat soybean flakes | 100 |
| Glacial acetic acid | 1.75 |
| Hexane | 500 |

The defatted flakes were air-dried and treated with a water-soluble peroxide as in Examples I, V or VI.

EXAMPLE NO. VIII

Same as Example No. VII but used hexane-extracted soybean flakes for chemical treatment.

EXAMPLE NO. IX

Treatment same as for Example V except soybean flakes (full-fat or defatted) had been previously treated with an aqueous solution of citric acid which was sprayed on the flakes at room temperature, while blending, i.e. in an insulated, baffled, rotating drum or a high speed mechanical blendor, so as to obtain uniform distribution of the solution on the flakes, and air-dried to equilibrium moisture, followed by the sodium peroxide treatment as described in Example V.

Proportions for chemical treatment:

| | Parts |
|---|---|
| Soybean flakes | 100 |
| Citric acid | 3 |
| $H_2O$ | 10 |

EXAMPLE NO. X

Same as Example IX except aqueous pretreatment of soybean flakes at an elevated temperature of 90–100° C.

EXAMPLE NO. XI

Same as Examples Nos. IX and X except used 1.5% NaCl instead of 3.0% citric acid.

The above Examples IX, X and XI provide a stepwise treatment when the legume seed particulates are pretreated chemically with a protonic acid or the salt of a protonic acid, or mixture of the acid and salt. These acids and salts can be utilized in the range of about 0.5 part to about 5 parts and preferably in the range of about 1 part to about 3 parts, based on 100 parts of the soybean particulates. Mixtures of said acids and/or salts are useful in pretreating of the legume seed particulates. The pretreated soybean flake product can be steam stripped under vacuum before treatment with the water-soluble peroxide.

The acids are water soluble and may be either organic or inorganic and are protonic as defined by the Brönsted-Lowry Theory. As indicated, the salts of these water soluble organic or inorganic acids must also be ionizable. The acids and salts are preferably of a class suitable for human consumption. Such salts and/or acidic water soluble chemical compounds may be synthetically produced as those obtained for example in using sea water. For preparation of edible chemically treated soybean products, such protonic acids and salts derived therefrom are exemplified as: sodium chloride, calcium chloride, acetic acid, citric acid, phosphoric acid and hydrochloric acid, and the like.

The following Tables I and II illustrate the uniformity and consistency in the improvement of the above treated soybean particulates ground to flour fineness, in comparison with conventional baker's soybean flours.

TABLE I.—BREAD SCORES FOR CONVENTIONAL BAKER'S SOY FLOURS [2]

| Sample No. | Loaf Volume (Percent of Control) | Grain | Texture | Body | Crumb Color | Odor |
|---|---|---|---|---|---|---|
| Control [1] | 100 | Close, thin, elongated | Velvety | Strong | 100 | Normal. |
| 1 | 107 | Very sl. open, thin, elongated. | do | do | 96 | Strong soy. |
| 2 | 95 | Open, thick, round | Harsh | Medium | 95 | Slight soy. |
| 3 | 96 | Sl. open, sl. thick, round | Very sl. harsh | Medium-strong | 96 | Normal. |
| 4 | 100 | Sl. open, sl. thin, round | do | do | 96 | Do. |
| 5 | 106 | Sl. open, thin, round | Velvety | Strong | 96 | Slight foreign. |
| 6 | 93 | Open, sl. thick, round | Very sl. harsh | Medium-strong | 96 | Slight soy. |

[1] Milk Control.
[2] Straight dough bread formula with 5% soy flour (based on wheat flour.)

TABLE II.—$H_2O_2$ TREATMENT AND ITS RELATIONSHIP TO THE QUALITY OF WHITE BREAD [1]

[The grain, texture and body of the bread was of high quality and equivalent to the control for all the samples baked]

| Sample No. | Treatment (50%) $H_2O_2$ (parts) [2] | Leaf Volume (Percent of Control) | Color | Odor |
|---|---|---|---|---|
| Control [3] | None | 100 | 100 | Normal. |
| 1009–62–5 | 1.0 | 100 | 97 | Do. |
| 132–9 | 2.0 | 98 | 96 creamy | Do. |
| 132–19 | 2.0 | 100 | 95 creamy | Do. |
| 132–26 | 2.0 | 102 | 97 | Do. |
| 132–27 | 2.0 | 110 | 96 creamy | Do. |
| 64–2 | 2.0 | 104 | 97 sl. creamy | Do. |
| 132–31 | 3.0 | 102 | 96 white | Do. |
| 132–31 | 3.0 | 102 | 96 | Do. |
| 132–30 | 4.0 | 114 | 97 white | Do. |
| 132–30 | 4.0 | 108 | 97 | Do. |
| 132–20 | 5.0 | 101 | 98 | Do. |
| 132–20 | 5.0 | 108 | 97 white | Do. |
| 132–20 | 5.0 | 111 | 97 | Do. |
| 132–29 | 5.0 | 110 | 97 sl. creamy | Do. |
| 132–29 | 5.0 | 104 | 97 | Do. |
| 63–14 [4] | 1.0 | 102 | 96 creamy | Do. |
| 62–2 [5] | 1.5 | 100 | 97 | Do. |
| 62–4 [6] | 1.5 | 101 | 97 | Do. |
| 64–4 [7] | 1.0 | 100 | 97 sl. creamy | Do. |

[1] Straight dough formula—5% soybean (based on wheat flour).
[2] Parts based on 100 parts soybean flakes.
[3] No soybean—3% milk (based on wheat flour).
[4] Pretreatment—1.75 parts glacial acetic acid in hexane.
[5] Pretreatment—3.0 parts citric acid in aqueous solution.
[6] Pretreatment—3.0 parts $CaCl_2 \cdot 2H_2O$ aqueous solution.
[7] Pretreatment—1.5 parts NaCl aqueous solution.

In the herein described process the heat treatment may be effected by micro-wave heating when aqueous systems are used.

Table I is a summary of typical bread scores for conventional baker's soy flours showing inconsistent and undesirable grain, texture, body, color and odor. The tests on 3 and 4 showed normal odor but poor grain, texture, and unacceptable properties. These scores are representative of repeat bakes.

Table II is a summary of a number of bread scores showing consistency and repeatable uniform results obtained from different lots and repeat bakes.

The bread bakes for the above Tables I and II were prepared according to the following formula:

STRAIGHT DOUGH FORMULA

| Ingredients | Weight (grams) | |
|---|---|---|
| Flour | 200 | 200 |
| Yeast | 2.56 | 2.56 |
| Sugar | 10.0 | 10.0 |
| Salt | 4.2 | 4.2 |
| Shortening | 5.0 | 5.0 |
| Water (variable) | 131 | 131 |
| Non-fat dry milk | 6 | 0 |
| Soy flour | 0 | 10 |

3½ hour fermentation.
3% milk solids was used as the control.
Prepared according to standard practice.

For a more complete understanding of the graphs, (FIGURES 1, 2, 3 and 4), viscosity measurements were obtained acording to the following procedure:

(1) Measure 290 mls. of distilled water in a graduated cylinder. Pour about 200 mls. into a 600-ml. beaker.

(2) Weigh 92±0.1 g. of defatted soybean product or 110.42 full-fat soybean product and transfer to the 600-ml. beaker.

(3) Blend the water and soybean with a spatula until the mixture is smooth being careful to incorporate as little air as possible. Add balance of water (90 mls.) and stir with the spatula.

(4) Stir for 2 minutes, using a mechanical type of stirrer which minimizes incorporation of air, at about 570–580 r.p.m.

(5) Final preparation of slurry:

(a) *Without caustic* ("as is" pH).—Gradually add 78 mls. of distilled water while agitating to give 20% solids based on total weight. Continually stirring for 8 mins. (570–580 r.p.m.) dilute, read and record pH. (For measuring accurate pH, 30±0.1 g. of soy slurry into a 100 ml. beaker. Add 30 mls. distilled water, stir and read pH).

(b) *With caustic* (pH 8.0 and 10.0).—Place electrodes in position in the slurry. Set timer for 8 minutes. Add 0.5 N KOH from a burette with continuous agitation to desired pH. Read and record mls. of 0.5 N KOH. 78 mls. minus Mls. of KOH equals mls. of $H_2O$ to add to give 20% solids based on total weight. Gradually add $H_2O$ and continue stirring to total of 8 mins. Measure pH is in 5(a).

(6) Pour the 430 g. into the measuring bowl of the Brabender Visco-amylo-Graph.

(7) Follow instructions for operation of the Visco-amylo-Graph—Type VA–V.

(8) Operating cycle (rate of temperature change—1½° C./minute).

| Interval | Minutes | Temperature (° C.) |
|---|---|---|
| Heating | 48 | 25–97 |
| Holding | 15 | 97 |
| Cooling | 48 | 97–25 |

(9) Rotation of measuring bowl 75 r.p.m.

(10) When the viscosity becomes greater than 1000 Brabender units, additional weights are added. Using the 700 cm./gm. sensitivity cartridge weight "B" will increase the reading—500 units; weight "C" will increase the reading—1000 units. All readings are in "Brabender Units."

(11) Read and record the final pH after cooling both on the concentrate and after making a 1:1 dilution as per 5(a).

FIGURE I illustrates the graphic results when using soybean particulates treated with a combination of protonic acids and/or their salts and hydrogen peroxide by the process described in my co-pending application Ser. No. 75,923, according to the viscosity measurement procedure described above.

At pH's of 5.5, 8 and 10 the difference in the viscosity curves indicates an inhibiting affect on hydrolysis as noted during the holding period, with lack of gelling characteristics during the cooling period, (step 8 of procedure).

Figure 2:
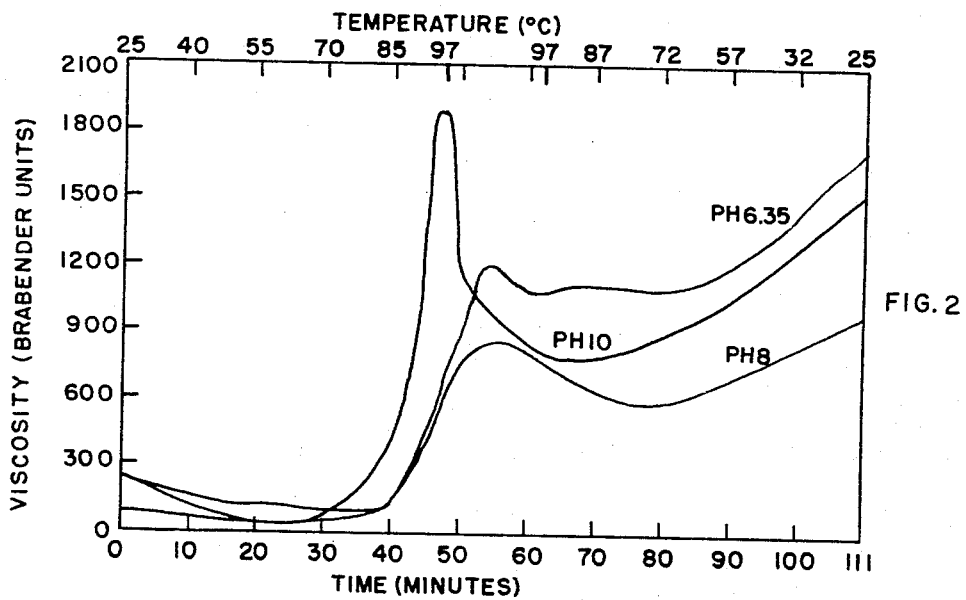

FIGURE 2 illustrates the effect of pH and heat on essentially native soybean flour under the viscosity measurement procedure as described. At pH's of 6.35 and 8 there was essentially no hydrolysis, or a minimum of hydrolysis. At pH 10 a rapid rate of hydrolysis occurred and to a much greater extent.

Figure 3:
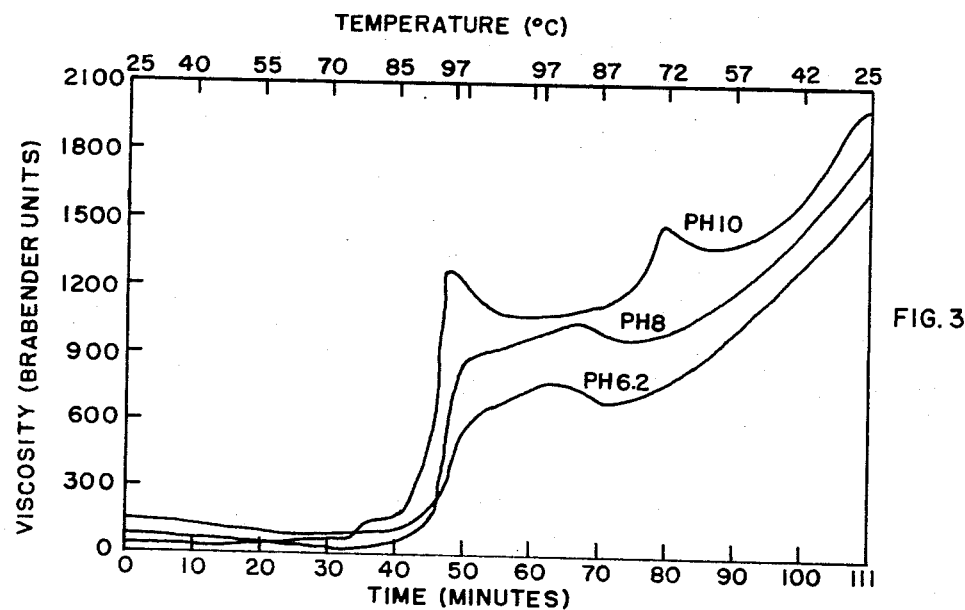
FIGURE 3 is identical to FIGURE 2 except the PDI range is 70 to 80%.

FIGURE 3 illustrates the effect of typical wet heat treatment of soybean particulates by a conventional process, prior to grinding, when viscosity is measured by the procedure described. At all three pH's, there was substantially no hydrolysis. However, during the cooling period for all three pHs there was a similar thickening or gelling characteristic.

Figure 4:
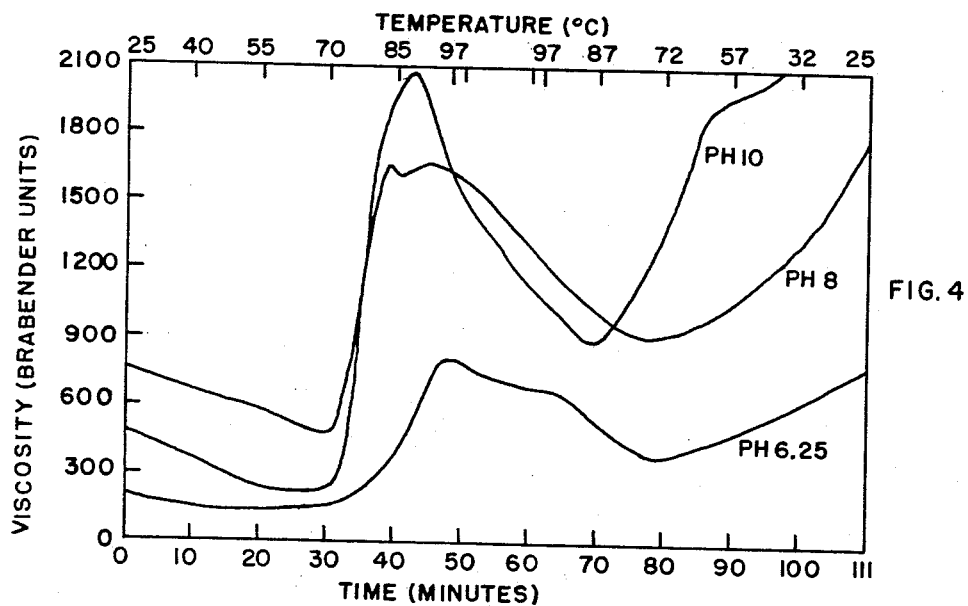
FIGURE 4 is a graph illustrative of the changes in functional and physical characteristics of soybean particulates treated in the manner herein described and tested in a manner identical to that described in FIGURE 1. The PDI of this treated soybean flour was 90 to 100%.

FIGURE 4 illustrates the graphic results when the treated soybean flakes of Example No. I were used in the viscosity measurement procedure. There is a marked affect on the rate and extent of hydrolysis at pH's 8 and 10. Also, it is noteworthy that at pH 8 comparatively, there was a significant amount of hydrolysis. At pH 10 a sharp gelation characteristic is noticed. Thus, as exemplified in Table No. II, the functional, physical and chemical characteristics are changed and improved for use in food products at their normal pH values, resulting in more consistent bread scores of high quality without soybean taste and odor.

While FIGURE 4 is illustrative of a defatted soybean flour prepared by the process of Example No. I, it has been found that a full-fat soybean flour, prepared as in Example No. II, has similar physical and functional changes. This is noted to be most unusual with respect to the rate and extent of hydrolysis at pH's 8 and 10. Also, the sharp gelatin characteristic at pH 10, for each, was noted.

Additional illustrative examples of economical savings and improved products are provided by the following:

TABLE III.—MUFFIN SCORES FOR EVALUATION OF FULL-FAT SOYFLOURS

| | Muffin Sample No. | | | | | |
|---|---|---|---|---|---|---|
| | 1 | 2 | 3 | 4 | 5 | 6 |
| Soy flour: | | | | | | |
| Sample Identification | Egg Control | Commerical Sample. | 1847-3-2 | 1847-3-3 | 1847-5-2 | 1847-4. |
| Grind | | Hammer Milled | Hammer Milled | Hammer Milled | Hammer Milled | Hammer Milled. |
| Mesh | | | ca. 14 | ca. 14 | Through 35 | Through 35. |
| Chemical Treatment | | None | 2% $H_2O_2$* | 2% $H_2O_2$* | 2% $H_2O_2$* | 1% Citric Acid (pretreatment), 2% $H_2O_2$. |
| Muffin Score: | | | | | | |
| Internal Color | Bright Yellow | Dull Dark Yellow. | Bright White-Yellow. | Bright White-Yellow. | Bright Yellow | Bright Yellow. |
| Texture | Typical | Tough | Typical | Typical | Tender sl. open | Tender sl. open. |
| Odor | do | Sl. off | do | do | Typical | Typical. |
| Flavor | do | Typical | do | do | do | Do. |

*(50%) $H_2O_2$.

The above products were prepared by the following formulation:

*Preparation of the muffins*

Premix:
| | | |
|---|---|---|
| All-purpose flour | K | 4.2 |
| Salt | g | 40.0 |
| Sugar | g | 420.0 |
| Baking powder | g | 245.0 |

Blend five minutes in the Peterson-Kelly Blendor.

(1) Blend the following five minutes using the Kitchen Aid Mixer (No. 1 speed):

Soy muffins:
| | G. |
|---|---|
| Premix | 140 |
| Defatted soyflour | 6.4 |
| Full-fat soyflour | 9.0 |

Egg control:
| | G. |
|---|---|
| Premix | 140 |

(2) Blend the following with a single beater hand mixer:

Soy muffins:
| | | |
|---|---|---|
| Whole milk | mls | 150 |
| Vegetable oil | mls | 28 |

Egg control:
| | | |
|---|---|---|
| Whole milk | mls | 120 |
| Vegetable oil | mls | 28 |
| Sl. beaten whole egg | g | 25 |

(3) Add the liquid ingredients to the dry ingredients in one lot blending only until the dry ingredients are all moistened. This requires mixing to the count of 8 using the Kitchen Aid Mixer set on No. 1 speed using the beater appliance.

(4) Portion 55 g. into 5 cups of a 6-cup muffin pan (166 M Mirro) which has been coated with Pam Dry Fry and tared.

(5) Bake 25 minutes in 425° F. preheated oven.

(6) Remove immediately from the pan to a cooling rack.

Water:
| | |
|---|---|
| Step 1 | 55.2 |
| Step 2 | 28.5 |
| Step 3 | 22.1 |
| Total | 106.0 |

Baking time (min.) _____ 24

MIXING DIRECTIONS

*Step 1*

Sift the scaled dry ingredients together twice.
Add the fat and blend with the dry ingredients using the Kitchen-Aid Mixer with the wire whip attachment. No. 2 speed—3 minutes.
Replace wire whip with the beater attachment. Add the water in a one-minute period, running mixer on No. 2 speed. Mix an additional one minute.
Scrape the beater and sides of the bowl.

*Step 2*

Gradually add the water mixing on No. 1 speed. Stop mixer when all water has been added. Again scrape the beater and sides of the bowl.
Mix 6 minutes on No. 4 speed.

*Step 3*

Add egg or soybean and water blended with the egg.
Begin final 4-minute mixing time on No. 2 speed as the gradual addition of the final water is made.
Do not scrape the beater and bowl upon completion of mixing.
Using a ladle, scale 400 g. into each 8" coated layer pan.[1]
Bake in a 375° F. preheated oven.
Place pans on rack and cool 10 minutes.
Turn the cakes out of the pans onto the rack and cool an additional 30 minutes.
Measure volume by the usual seed displacement method. Flax seed was used.

[1] Pan coating.

TABLE IV—COMPARATIVE DATA FOR YELLOW CAKES[1] USING VARIOUS FULL-FAT SOYFLOURS AT A 50% EGG SOLIDS REPLACEMENT LEVEL

| Sample No. | Soyflour | | Volume[3] (percent) | Scoring | | | |
|---|---|---|---|---|---|---|---|
| | Kind | $H_2O_2$ (parts) | | Color | Grain | Texture | Odor and Flavor |
| 1 | 1847-5-2, 2% $H_2O_2$ (50%) only | 200 | 98 | Light, bright | Even, fine | Tender | Normal. |
| 2 | do | 300 | 99 | do | do | do | Do. |
| 3 | 1847-3-5, 2% $CaCl_2$ (Pretreatment) 2% $H_2O_2$. | 200 | 102 | do | Even | do | Do. |
| 4 | 1847-3-5, 2% $CaCl_2$ (Pretreatment) 2% $H_2O_2$. | 300 | 99 | do | Even, sl. open | do | Do. |
| 5 | Commercial Sample | 300 | 88 | Light, dull | do | do | Soybean odor and flavor. |

[1] A low ratio formula.
[2] Parts based on soyflour.
[3] Percent based on control.

The above products were prepared by the following formulation:

LOW RATIO YELLOW CAKE FORMULAS

Ingredient: Percent of ingredient based on flour
| | |
|---|---|
| Sno-Sheen-Pillsbury cake flour (70–80% Patent—air classified) | 100 |
| Bakers' special sugar | 100 |
| Salt | 1.47 |
| Nonfat dry milk, spray dried | 12.3 |
| Fleishmann's phosphate baking powder with calcium lactate | 5.5 |
| Vreamay (high ratio emulsifying shortening) | 20 |
| Frozen whole egg (22 or 26% solids) | 25.1 |

For best release, the following coating was prepared and used on the cake pans:

| | G. |
|---|---|
| Vreamay shortening | 302 |
| Bakers' nutrisoy flour | 24 |
| Wheat flour | 77 |

Blend these ingredients until creamy in the Kitchen-Aid Mixer using the wire whip.

The above results clearly show that the soybean flour, when treated in the specific manner herein described, eliminated soybean odor and flavor, as evaluated in bread, cakes and muffins. The use in this form has been described relative to the treated flakes being ground from relatively coarse to fine flour form, for food applications. Otherwise, the treated particulates may be utilized directly in their granular treated form, or ground to flour form for food and other industrial applications.

Having described the above procedure with soybean particulates, it will be recognized that other legume seed particulate material can be likewise treated for use in providing such treated material for food and commercial useage.

From the description, it will be apparent that some modifications and variations of the invention or discovery and improvements herein provided may be made without departing from the spirit and scope thereof. The specific embodiments described are given by way of example illustrative of the discoveries herein provided and which are to be limited only by the terms of the appended claims.

The embodiments of the invention in which an exclusive property or privilege is claimed are defined as follows:

1. The process of treating legume seed particulates comprising the steps of adding to essentially dry particulates of legume seed material a treating agent consisting essentially of from about 0.25 part to about 5 parts, based on 100 parts of said legume seed particulates, of a water-soluble peroxide selected from the group consisting of hydrogen peroxide, sodium peroxide and urea peroxide, with not over about 20% added moisture in excess of equilibrium moisture of the said dry particulate legume seed material, holding the said treated particulates at a temperature of from 65° C. to 100° C. for a period of about 30 seconds to about 15 minutes, and drying said particulates by cooling until equilibrium moisture is achieved.

2. The method of treating soybean particulates comprising adding to essentially 100 parts of dry soybean flake material a treating agent consisting essentially of from about 0.25 part to about 5 parts water-soluble peroxide based on 100 parts of said soybean particulates with not over about 20% moisture present in excess of equilibrium moisture based on the said flakes, holding the said treated flakes at a temperature of from about 65° C. to about 100° C. for a period of about 30 seconds to about 15 minutes to remove soybean odor and soybean flavor without detrimental changes in the functional and physical properties of the treated flake material, and drying the said treated flake material, said peroxide being selected from the group consisting of hydrogen peroxide, sodium peroxide, and urea peroxide.

3. A method comprising treating hexane-extracted, soybean flake material with a treating agent consisting essentially of 0.25 part to 5 parts of hydrogen peroxide, based on 100 parts of said soybean flake material, with not over 20% moisture present in excess of the equilibrium moisture of said soybean flake material, holding the so-treated soybean flake material at a temperature of from 65° C. to 100° C. for a period of 30 seconds to 15 minutes, and drying the so-treated soybean flake material.

References Cited

UNITED STATES PATENTS

| 1,510,606 | 10/1924 | Phillips | 99—98 |
| 1,912,895 | 6/1933 | Gossel | 99—98 |
| 2,322,516 | 6/1943 | Horvath | 99—98 |
| 2,930,700 | 3/1960 | Bradof | 99—98 |
| 3,100,709 | 8/1963 | Paulsen | 99—98 |
| 3,126,286 | 3/1964 | Moshy | 99—98 |

ALVIN E. TANENHOLTZ, *Primary Examiner.*

A. LOUIS MONACELL, *Examiner.*

S. J. BAICKER, *Assistant Examiner.*